United States Patent
Hornung

(10) Patent No.: US 9,253,947 B2
(45) Date of Patent: Feb. 9, 2016

(54) COMBINATION COTTON TRANSPORT CART AND MODULE BUILDER

(71) Applicant: Donald F. Hornung, Dodge City, KS (US)

(72) Inventor: Donald F. Hornung, Dodge City, KS (US)

(*) Notice: Subject to any disclaimer, the term of this patent is extended or adjusted under 35 U.S.C. 154(b) by 207 days.

(21) Appl. No.: 13/998,161

(22) Filed: Oct. 8, 2013

(65) Prior Publication Data

US 2015/0096450 A1    Apr. 9, 2015

(51) Int. Cl.
| | |
|---|---|
| *A01F 15/00* | (2006.01) |
| *A01F 15/10* | (2006.01) |
| *A01D 90/00* | (2006.01) |
| *A01D 85/00* | (2006.01) |

(52) U.S. Cl.
CPC .............. *A01D 90/00* (2013.01); *A01D 85/004* (2013.01); *A01F 15/00* (2013.01); *A01F 15/10* (2013.01)

(58) Field of Classification Search
CPC ..... B30B 9/3042; B30B 9/3046; A01F 15/00; A01F 15/10; A01F 15/101; A01F 2015/105; A01D 46/084; A01D 46/082; A01D 85/004; A01D 46/22; A01D 90/105; A01D 90/00; B60P 1/435; B60P 1/34; B60P 1/02
USPC .................. 100/100, 215, 218, 226; 56/16.6
See application file for complete search history.

(56) References Cited

U.S. PATENT DOCUMENTS

| | | | | |
|---|---|---|---|---|
| 4,344,272 | A * | 8/1982 | Gaudette et al. ............... | 56/16.6 |
| 4,347,696 | A * | 9/1982 | Johnson ......................... | 56/16.6 |
| 4,362,457 | A * | 12/1982 | Taylor et al. ................... | 414/345 |
| 4,382,631 | A * | 5/1983 | Johnson ...................... | 298/17 SG |
| 4,505,631 | A * | 3/1985 | Warner et al. .................. | 414/359 |
| 4,793,126 | A * | 12/1988 | Wood et al. ..................... | 56/16.6 |
| 5,338,140 | A * | 8/1994 | Ekdahl et al. .................. | 414/346 |
| 6,443,836 | B1 * | 9/2002 | Horejsi et al. ................. | 460/119 |
| 2002/0100375 | A1 * | 8/2002 | Deutsch et al. ..................... | 100/8 |
| 2005/0217509 | A1 * | 10/2005 | Covington ........... | A01D 46/084 100/88 |

* cited by examiner

Primary Examiner — Jimmy T Nguyen

(57) ABSTRACT

An easily transportable cotton module builder includes a side mounted dump basket for receiving a load of cotton bolls from a cotton picker or stripper. The module builder is sized to form a module of half standard size, which enables the unit to be readily transportable on fields and roads. The basket expands outwardly, is lightweight and is sized to receive a full load dump from a cotton picker or stripper, then the basket swings up and over a module builder compression chamber. A compression bridge extends across the top of the compression chamber and supports a tamper bar assembly which compresses the cotton dumped in the chamber. The module builder compression chamber takes two to three loads from a cotton picker or stripper before it reaches capacity.

7 Claims, 6 Drawing Sheets

COMBINATION COTTON TRANSPORT CART AND MODULE BUILDER

FIELD OF THE INVENTION

This invention relates to a machine for assembling a bulk load of harvested cotton into a so-called module, and particularly into a machine that receives harvested cotton from a harvester, compacts and forms the cotton, and deposits a cotton module onto a surface for pick-up and later transport to a cotton gin.

BACKGROUND OF THE INVENTION

Cotton module builders are used for assembling a module, or formed block of packed cotton, from a harvester, in preparation for the cotton to be transported to a cotton gin. The gin combs the cotton fibers, separates the desirable lint from the seeds, discards stems, and weed components, and readies the combed lint cotton for further processing into batting, milling into sliver and thread and other uses for cotton. Because harvested cotton is fluffy and takes up significant transport space, the building of a compressed module for storage, transport and further processing is an important and necessary step in cotton processing.

Historically, cotton was dumped from a storage basket integral to a cotton harvester picker or stripper and from the storage basket into a trailer for transporting the seed cotton to a gin. Modern practices employ a module builder which receives harvested cotton and forms a block of compressed cotton ready for transport to a gin. The module of compressed cotton is intended to reduce the number of loads to the gin because the cotton is compressed. Module builders have, before the present invention been seen to lack efficiency, require additional equipment and operators, be too slow in processing, have too little capacity and not be as advanced as possible.

The present invention is considered to improve upon prior module builders and is targeted toward improving capacity, efficiency, speed and reduction of additional equipment and operators.

SUMMARY OF THE INVENTION

The present invention combines the functions of a cotton cart with a module builder to receive basket load dumps from a cotton harvester picker or stripper harvester, and then compress the received cotton into a formed and compressed module, thereby eliminating the previous need for separate cotton carts and module builders in the harvesting and transport to gin process. A compressed cotton module is made directly from the fluffy cotton load as it is received and the module left in the field for pick up and later transport to the gin. This process eliminates a need for a cotton cart to be pulled alongside a harvester and then the cart hauled to a field side location and then the cart contents dumped into a module builder. The present invention reduces by half the equipment and operators needed and greatly increases the speed of field operations. The module building cotton cart of the present invention builds a compressed module while being pulled in the field, deposits the compressed module at a turn row, and stays on location by the cotton harvester.

To accomplish this, the module building cotton cart of the present invention employs a receptacle with an expanding basket that is sized to receive a full load from a harvester, and then to compact and form the cotton load. There is a compression mechanism with a tamper bar that is mounted atop a compression chamber and extends longitudinally between opposite end walls. A base of the cotton cart has a conveyor floor for moving the formed module out of the cart.

DETAILED DESCRIPTION OF THE PREFERRED EMBODIMENT

The following detailed description of the preferred embodiment is intended to present an example of the invention, and the invention is not to be limited to the form of the preferred embodiment, others may be developed from this disclosure and be within the scope of the invention.

Figure 1:
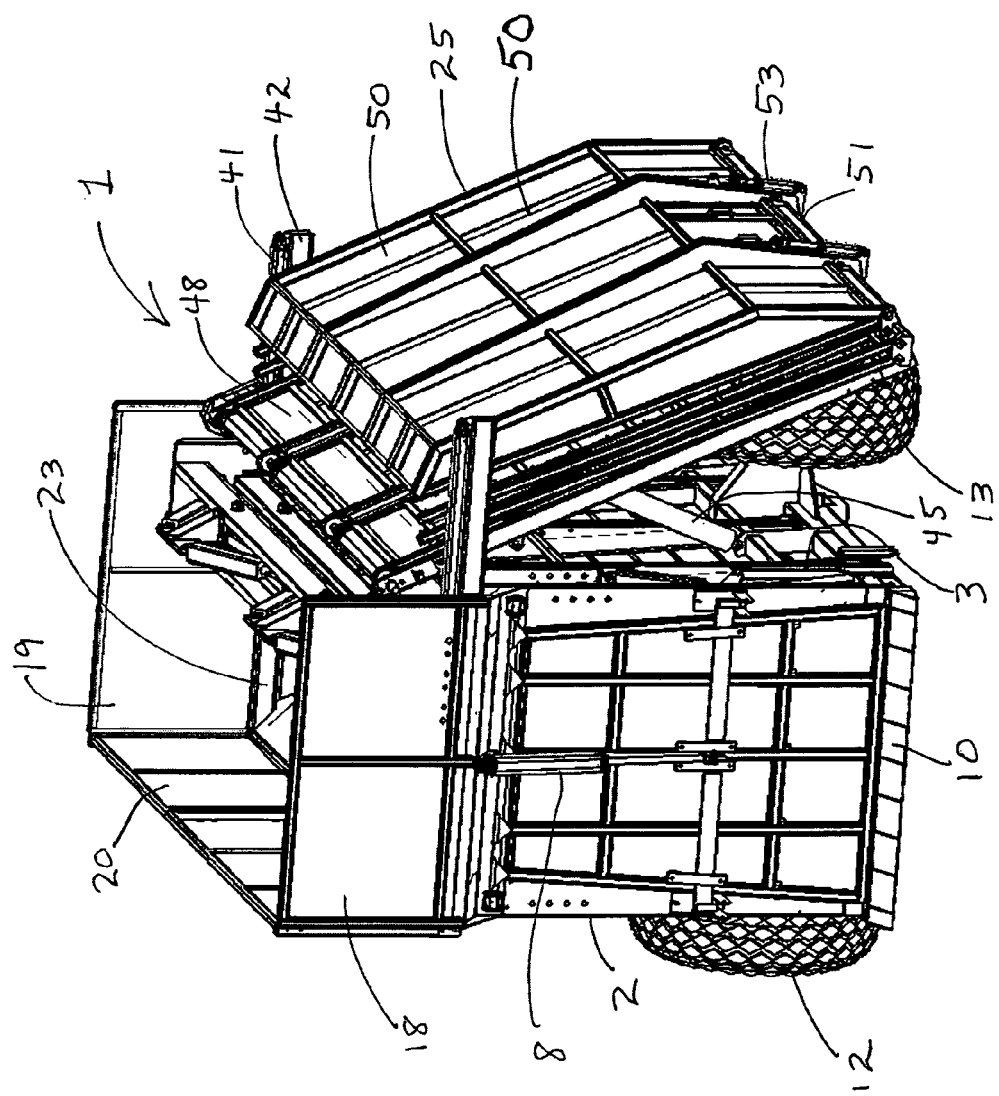
FIG. 1 is a perspective view of the module building cotton cart with basket in down, unloaded, transport position.

In FIG. 1 is shown a module builder transport cart 1 embodying the invention. Basic components of the cart 1 include a wheeled receptacle generally in the form of a rectangle with elongate sidewalls 2 and 3 a front end wall 5, and a rear opening end wall 6. The rear wall 6 has a top hinged door 7 which swings open by action of a hydraulic ram 8 to allow a finished cotton module to exit the cart 1.

The side walls 2 and 3 and end walls 5 and 6 are sturdily built of framework and panels to withstand rough field conditions and load of a compressed cotton module weighing approximately 6500 to 9000 pounds. In the vernacular of the cotton harvest and gin industry, a full module is sized approximately 7½ feet by 32 feet by 7 feet tall and weighs 12,000 to 18,000 pounds. The module builder transport cart 1 can be sized to build any size of module; however, considering road transport size and weight restrictions the cart 1 is more appropriately sized to build a half module of 7½ by 16 feet and 7 feet high and 6,500 to 9,000 pounds. For purposes of this disclosure, what would be called a half module at the gin, is called a module herein.

The side walls 2 and 3 and end walls 5 and 6 extend upward and connect to a floor 10. The floor 10 is hinged mounted to the front wall 5 and swings downwardly by action of hydraulic rams 11 to facilitate exit of the module after compaction. Wheels 12 and 13 with flotation tires mount to sidewalls 2 and 3 for transport.

A floor conveyor 15 mounts across the floor 10 and is powered to move the completed module rearward and out through doors 7 and 8. Hydraulically or electrically driven chains with cross bars are suitable for the purpose.

Lightweight panels 18, 19, 20 are mounted atop respective end and side walls 2, 5, 6 and prevent spillover when a dump basket, described following, dumps its load of cotton into the cart. Together the aforementioned components form a compaction chamber 23 in which is formed a compacted cotton module after loose fluffy cotton is dumped from a side mounted basket 25. To compress and compact the loose cotton, a tamper mechanism 30 is mounted across the open top of the chamber 23. The tamper mechanism 30 is mounted longitudinally and is formed of bridge beams 31 extending between end mounts 32 that are slide mounted on the top edges of front and rear end walls 5 and 6. Spaced scissor jacks 34, 35 are mounted at top ends to the top bridge beams 31 and at lower ends to a broad tamper foot 37 extending substantially the full length of the bridge beams and the full length of the chamber 23. Hydraulic rams 39 power the scissor jacks 34, 35. The tamper mechanism 30 moves from side to side atop the chamber 23 by long throw cylinders 41 running along each of the front and rear walls 5, 6 and running through extension beams 42. The range of movement of the tamper mechanism 30 is such that substantially all of the area of the chamber 23 is covered so that all loose cotton therein can be compacted.

Figure 2:
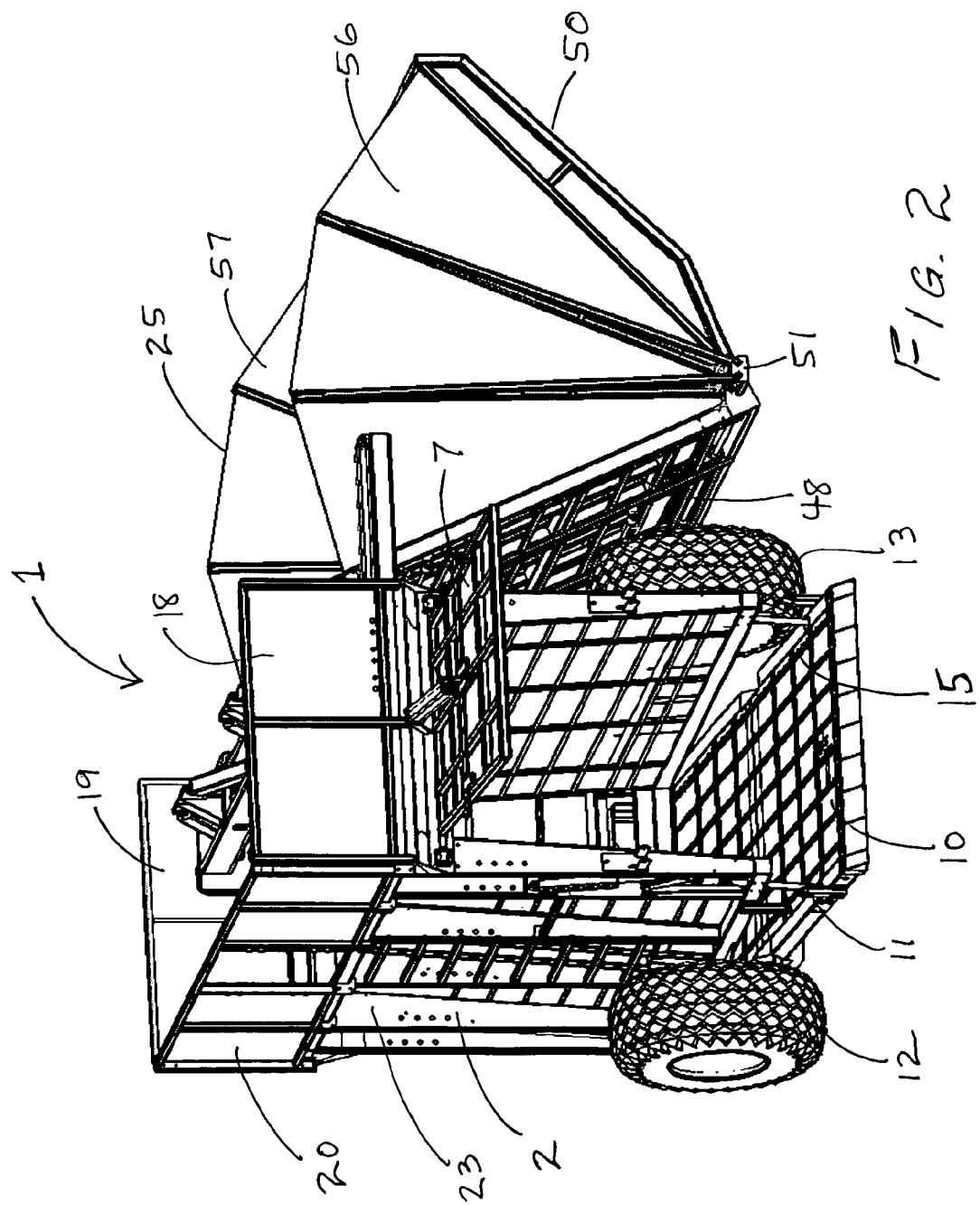
FIG. 2 is a perspective view of the cart showing the basket opened and ready to receive cotton from a harvester.
Figure 3:
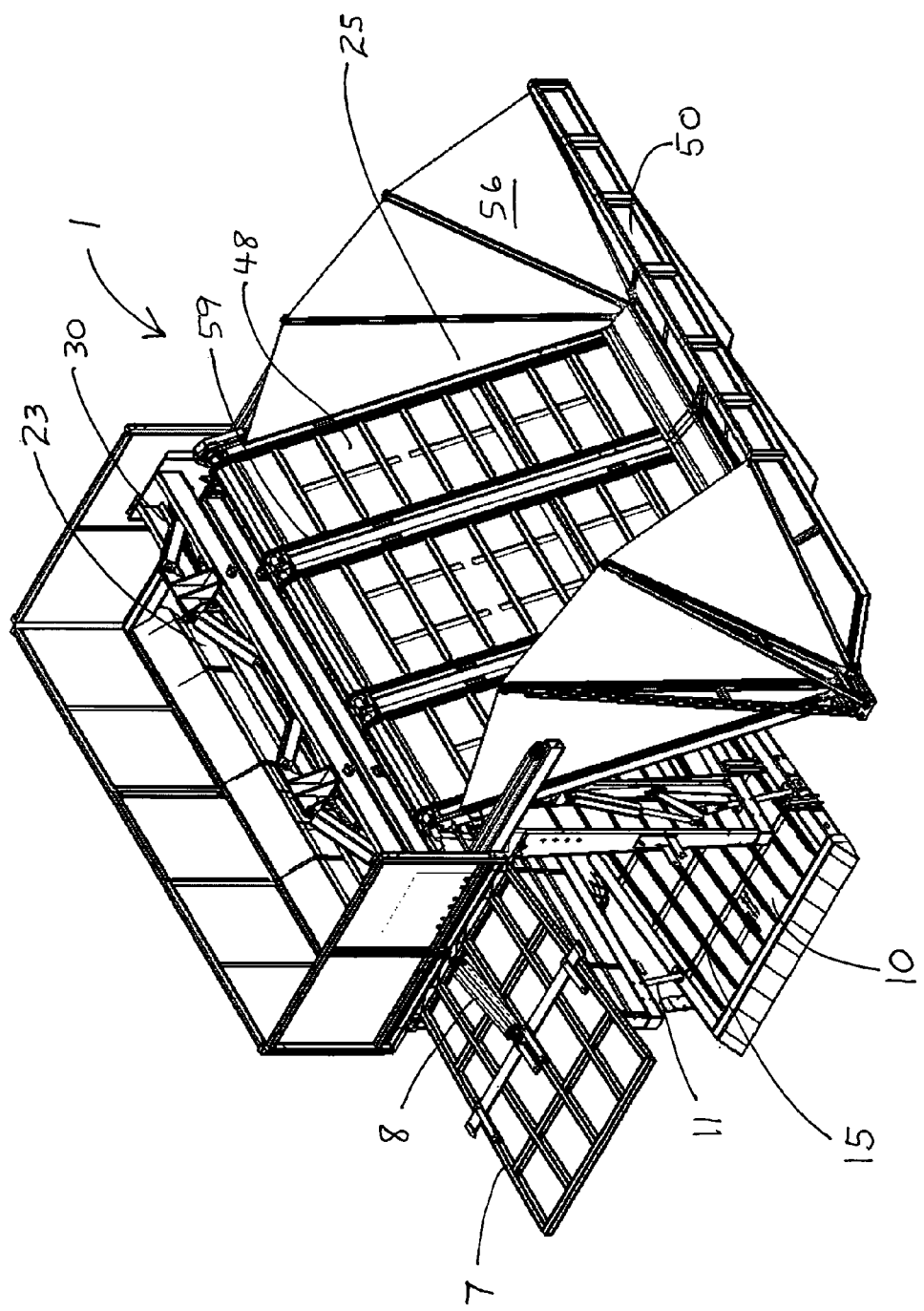
FIG. 3 is a perspective view of the cart with basket down and open and exit door open.
Figure 4:
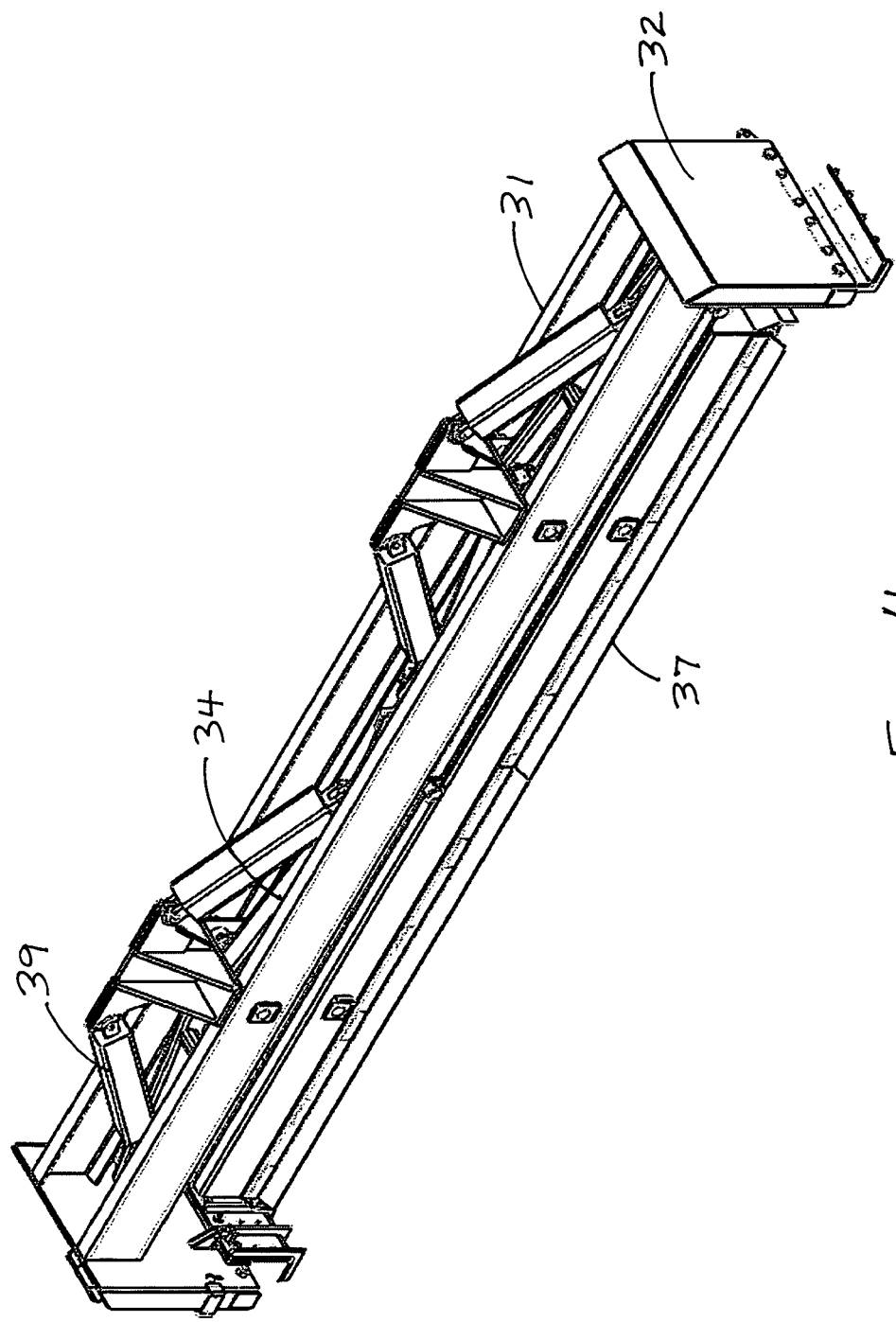
FIG. 4 is a perspective view of the tamper mechanism in retracted position.
Figure 5:
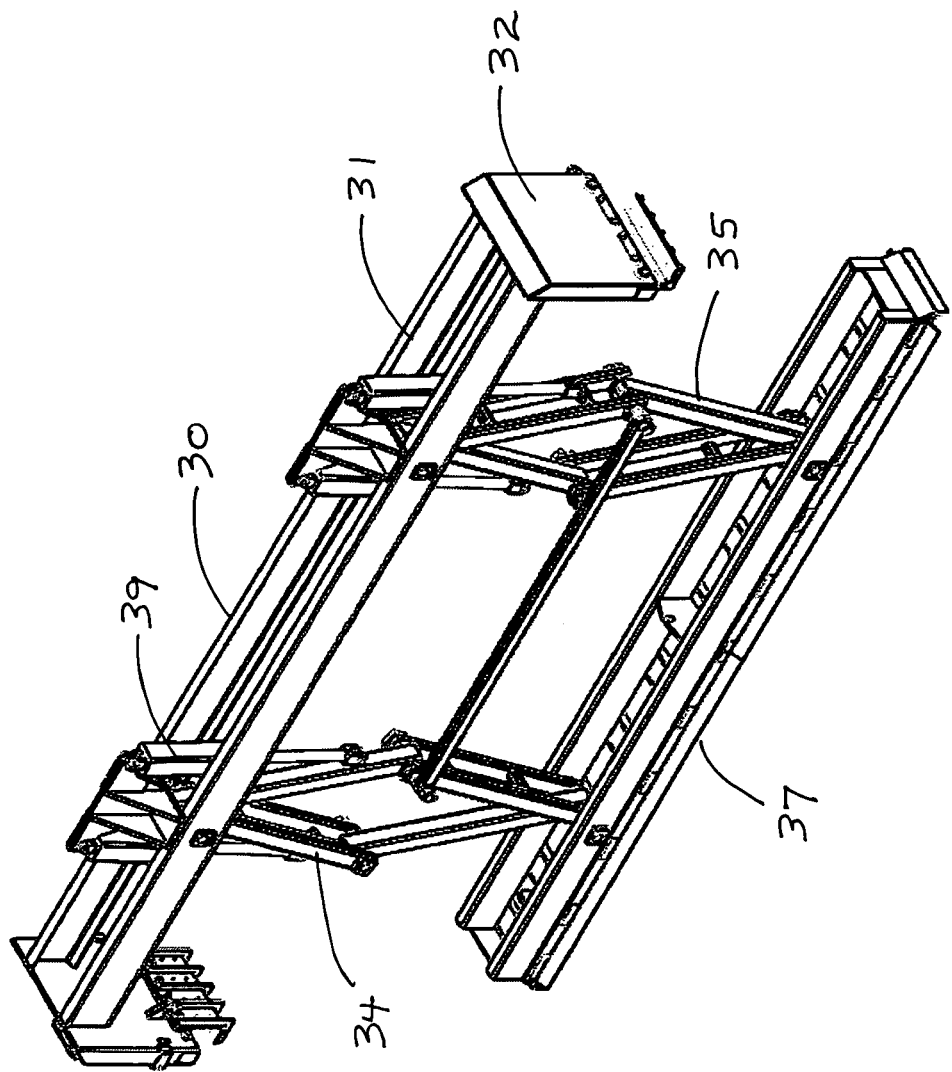
FIG. 5 is a perspective view of the tamper mechanism in extended position.
Figure 6:
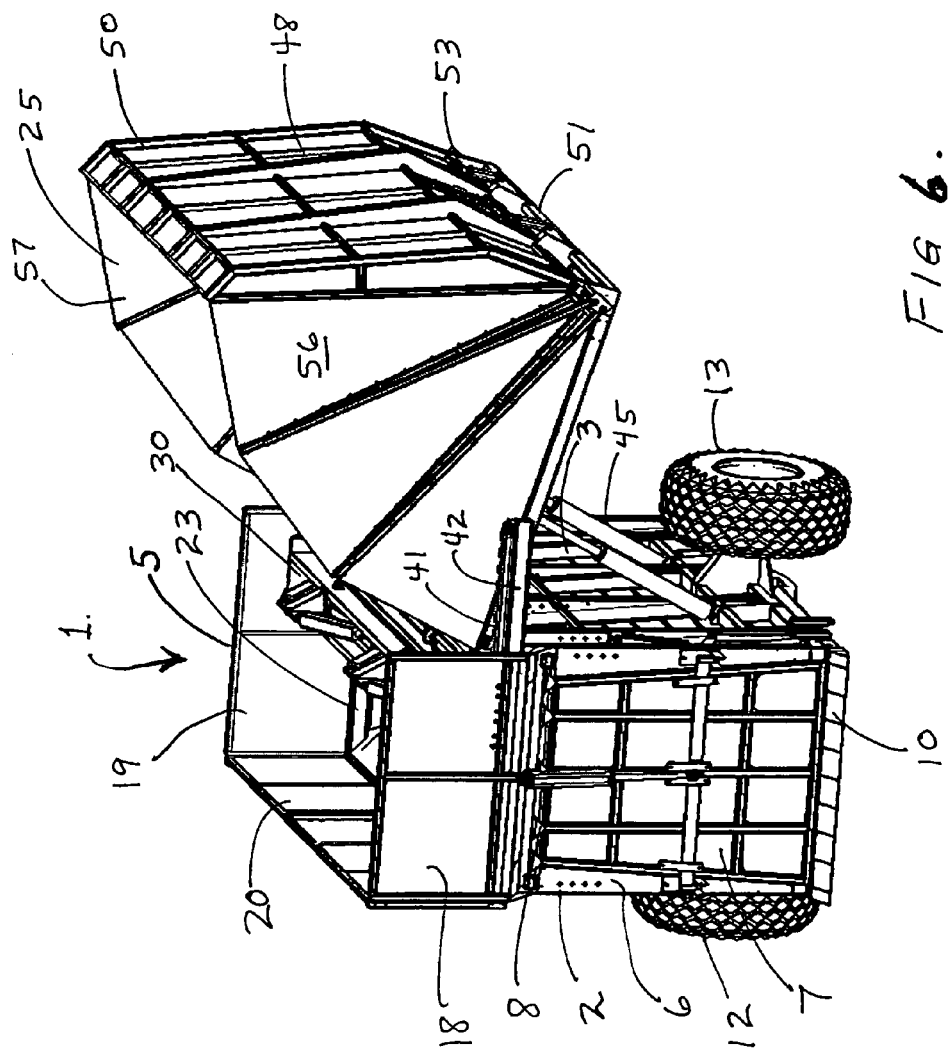
FIG. 6 is a perspective view showing the basket open and raised into dumping position for depositing a load of cotton into a compression chamber.

The dump basket 25 is hinge mounted to the top of sidewall 3 and swings between a lowered position against the cart wheel 13 to a raised position dumping contained cotton into the compaction chamber 23. Upward swinging is accomplished by hydraulic rams 45. The basket 25 is constructed of lightweight materials consisting of beams holding a floor panel 47 and forming the floor of the basket 25. A top panel 50 is hinge mounted at a remote end 51 of the floor panel 47 and is opened and closed by rams 53. Side webs 56, 57 are preferably of durable fabric material and are folded as the top panel 50 opens and closes against the floor panel 48. A lightweight chain conveyor 59 with crossbars is mounted on the floor panel 48 and provides movement of contained cotton from the dump basket 25 into the compaction chamber 23. The dump basket is sized to fold to approximately one third of its expanded size, FIGS. 1 and 2, for ease of storage and transport.

Ideally, the dump basket 25 is sized to receive a full load from the accumulation hopper of a cotton picker harvester, generally about 1300 cubic feet. This size sameness provides quick turns and transfer of the harvester load into the cotton cart. The cart compaction chamber 23 receives the full load from the basket 25, and while being transported in the field to a location to receive the next harvester load, the loose cotton in the chamber can be compacted by the tamper mechanism 30. The approximately 1300 cubic feet load of the basket 25 dumped in the chamber 23 will compact to approximately half the capacity of the chamber 23 so that the chamber will be filled by compacted cotton after two to three full dumps of the harvester hopper. At that, the module of formed and compacted cotton is conveyed from the chamber 23 by the floor 10 lowering, the door 7 raising and the floor conveyor 15 operating to move the module out and deposit it on the ground for pick up and transport.

A programmable controller (not shown) is preferably used and connected into hydraulic controls for coordinated operation of the module building and deposit process, For example, the controller uses a module build cycle to compress the load of cotton dumped in the basket and a module exit cycle to lower the chamber floor, open the rear door and start the chamber floor conveyor to move the completed module from the cart.

What is claimed and desired to be secured by Letters Patent is:

1. A cotton module builder comprising:
    a. a receptacle having side walls and end walls and an open top forming a compression chamber;
    b. transport wheels for movement;
    c. a dump basket swingably joined to a side wall of said receptacle and movable between a lowered, cotton receiving position and a raised, cotton dumping position depositing cotton into said compression chamber;
    d. a compression mechanism extending across the top of said compression chamber and having a tamper bar extendible downwardly to compress cotton in the compression chamber; and
    e. the dump basket being expandable in size between a retracted size suitable to transport and an expanded size suitable for receiving cotton loads from a cotton picker or stripper.

2. The module builder of claim 1 wherein the compression chamber has a conveyor floor for moving a cotton module from the module builder.

3. The module builder of claim 1 wherein the dump basket has a conveyor floor for moving cotton outwardly and into the compression chamber.

4. The module builder of claim 3 wherein the dump basket has side walls of flexible material which fold and open.

5. The module builder cart of claim 1 wherein the dump basket collapses to approximately one third of its expandable size.

6. A cotton module builder cart comprising:
    a. a receptacle having side walls and opposite end walls and an open top forming a compression chamber;
    b. transport wheels for movement;
    c. a dump basket swingably joined to a side wall of said receptacle and of substantially the same length as the distance between the compression chamber end walls, the dump basket being expandable in size and movable between a lowered, cotton receiving position and a raised, cotton dumping position depositing cotton into said compression chamber to substantially fill with a single dump; and
    d. a compression mechanism extending longitudinally across the top of said compression chamber and between the opposite end walls and having a tamper bar extendible downwardly to compress cotton in the compression chamber in readiness for subsequent dumps of cotton by the dump basket into said compression chamber.

7. A cotton module builder cart comprising:
    a. a receptacle having side walls and opposite end walls and an open top forming a compression chamber;
    b. transport wheels for movement;
    c. a dump basket swingably joined to a side wall of said receptacle and of substantially the same length as the distance between the compression chamber end walls, the dump basket being expandable in size and movable between a lowered, cotton receiving position and a raised, cotton dumping position depositing cotton into said compression chamber to substantially fill with a single dump; and
    d. a compression mechanism extending longitudinally across the top of said compression chamber and substantially fully between the opposite end walls and including a bridge with a hydraulically actuated scissors mechanism mounting a tamper bar extendible downwardly to compress cotton in the compression chamber in readiness for subsequent dumps of cotton by the dump basket into said compression chamber.

\* \* \* \* \*